US008042096B2

(12) United States Patent
Hoerentrup et al.

(10) Patent No.: US 8,042,096 B2
(45) Date of Patent: Oct. 18, 2011

(54) METHOD FOR AUTOMATICALLY SELECTING A SOFTWARE APPLICATION

(75) Inventors: Jobst Hoerentrup, Hannover (DE); Dirk Gandolph, Ronnenberg (DE); Ralf Ostermann, Hannover (DE); Carsten Herpel, Wennigsen (DE); Uwe Janssen, Seelze (DE); Hartmut Peters, Barsinghausen (DE); Andrej Schewzow, Hannover (DE); Marco Winter, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 1211 days.

(21) Appl. No.: 11/579,844

(22) PCT Filed: Apr. 13, 2005

(86) PCT No.: PCT/EP2005/003867
§ 371 (c)(1),
(2), (4) Date: Nov. 8, 2006

(87) PCT Pub. No.: WO2005/109188
PCT Pub. Date: Nov. 17, 2005

(65) Prior Publication Data
US 2008/0134143 A1    Jun. 5, 2008

(30) Foreign Application Priority Data

May 10, 2004    (EP) .................................. 04011063

(51) Int. Cl.
*G06F 9/44* (2006.01)
*G06F 9/45* (2006.01)

(52) U.S. Cl. .......................... 717/121; 717/120; 717/148
(58) Field of Classification Search .................... None
See application file for complete search history.

(56) References Cited

U.S. PATENT DOCUMENTS

| | | | |
|---|---|---|---|
| 6,173,246 B1 | 1/2001 | Billups, III | |
| 6,742,176 B1 * | 5/2004 | Million et al. | 717/120 |
| 6,968,506 B2 * | 11/2005 | Yacovone et al. | 715/730 |
| 7,219,331 B2 * | 5/2007 | Pabla | 717/120 |
| 7,426,721 B1 * | 9/2008 | Saulpaugh et al. | 717/144 |
| 7,600,218 B2 * | 10/2009 | Yamamoto et al. | 717/121 |
| 7,703,073 B2 * | 4/2010 | Illowsky et al. | 717/121 |
| 2006/0143666 A1 * | 6/2006 | Okada et al. | 725/89 |
| 2008/0134143 A1 * | 6/2008 | Hoerentrup et al. | 717/120 |

OTHER PUBLICATIONS

"Managing video collections at large", Moenne-Loccoz et al., Jun. 2004, pp. 59-66, <http://delivery.acm.org/10.1145/1040000/1039484/p59-moenne-loccoz.pdf>.*
"SMART: an efficient, scalable, and robust streaming video system", Wu et al., Jan. 2004, pp. 192-206, <http://delivery.acm.org/10.1145/1290000/1289357/p192-wu.pdf>.*

(Continued)

*Primary Examiner* — Thuy Dao
(74) *Attorney, Agent, or Firm* — Robert D. Shedd; Vincent E. Duffy; Joel M. Fogelson

(57) ABSTRACT

Method for automatically selecting a software application being a program for execution on a virtual machine, including the steps of
receiving an exit status value from a terminating software application;
translating the exit status value to an identifier for the next software application to be executed, wherein a mapping table is used;
executing on the virtual machine the next software application (J4) program that is represented by the identifier.

12 Claims, 3 Drawing Sheets

OTHER PUBLICATIONS

"Audio-visual interfaces in digital art", Edmonds et al., Sep. 2004, pp. 331-336, <http://delivery.acm.org/10.1145/1070000/1067392/p331-edmonds.pdf>.*

W. Burleson et al.: "Multimedia systems: enabling computer engineering education" FIE 2002, 32nd Annual Frontiers in Education Conference, Boston, MA, Nov. 6-9, 2002, vol. vol. 1 of 3, Conf. 32, Nov. 6, 2002, pp. 279-284.

IBM: "MQSeries Workflow" [Online] 1999, pp. 1-20.

* cited by examiner

METHOD FOR AUTOMATICALLY SELECTING A SOFTWARE APPLICATION

This application claims the benefit, under 35 U.S.C. §365 of International Application PCT/EP05/003867, filed Apr. 13, 2005, which was published in accordance with PCT Article 21(2) on Nov. 17, 2005 in English and which claims the benefit of European patent application No. 04011063.7, filed May 10, 2004.

FIELD OF THE INVENTION

This invention relates to a method for automatically selecting a software application. In particular, the invention relates to the lifecycle management of Java applications.

BACKGROUND

Multimedia data on a pre-recorded optical storage medium, e.g. digital versatile disc (DVD), can belong to different applications, e.g. different video titles, games or the like. They are usually embedded into the programming structure of the medium as applications, which can be individually started.

For pre-recorded optical media it is however desirable to have well defined content appearance and user experience, e.g. interactivity, as well as sophisticated authoring possibilities. Java technology can meet these requirements, as it is independent of the underlying hardware and operating system, and provides a full-fledged programming environment including e.g. graphics and network interfaces. Java technology uses an execution unit called Java Virtual Machine (JVM) to execute so-called bytecode, which is retrieved from files that are called class files. They may be organized in libraries or packages. The JVM is specified as an abstract machine and can be understood as a separate software layer that requires processing unit hardware to be executed.

Different configurations and profiles exist for Java runtime environments within consumer electronics devices, wherein each profile is suitable for a certain type of devices. The main difference between different profiles is which libraries they support. Profiles like e.g. the "Personal Basis Profile" and the "Personal Profile" are more suitable for consumer electronics devices.

In the classical application model an application is either in the active or inactive state. Beyond this basic model, the mentioned profiles define an enhanced application model, called the "Xlet" application model, which allows fine-grained control over the lifecycle of an application. The system encompasses an "Application Manager" (AM), which is a software entity that controls the lifecycle of all running applications through a specific interface. E.g. the AM can load an application into a JVM, start and stop it.

Accordingly, an application is at any point in time in one of a number of lifecycle states, e.g. loaded, started or stopped. An application may change its lifecycle state by itself. The AM provides an application management interface (AMI), through which an application signals its state or state changes. Thus, the AM has at any time up-to-date information about the lifecycle state of all applications.

SUMMARY OF THE INVENTION

A problem to be solved by the invention is the integration of Java into an existing system. In principle, a lifecycle model is needed that defines when and how an application is started and what happens when an application terminates or is terminated, i.e. a model that defines the system behavior, in order to improve the flexibility of interaction between AM and applications.

The invention is based on employing for each application stored on a storage medium, e.g. a pre-recorded storage medium, a mapping table, which may be stored on the same or another storage medium and which is used to translate application exit status information (which is application specific) of the respective application into identifiers representing titles or Java applications that are also stored on a medium, e.g. the same medium, and therefore are disc specific, and that shall be executed next. Thus, when a Java application finishes, the player may apply the exit status information of a finishing application to the respective mapping table, read the mapping table return value and continue with the specified entity derived from the table.

A common way for software applications to provide status information is to terminate with an exit code, which can be analyzed by superordinate or subsequent software layers.

The invention allows usage of a particular mapping table for one, more than one or all applications stored on a storage medium. I.e. in one embodiment of the invention the storage medium contains as many mapping tables as it holds Java applications, while in another embodiment the storage medium contains less, but at least one mapping table that is shared by several or all applications stored on the medium. It is also possible that a storage medium contains one or more mapping tables according to the invention for only some, but not all of the applications that it holds.

The present invention constitutes a flexible and robust method by which an author of e.g. a multimedia disc can control the system behavior of a playback device during playback of the disc, particularly in the case when a Java application lifecycle on a playback device ends. Thus, it is possible for a disc author to pre-define a flexible sequence of the different independently retrievable applications on the disc, thereby also enabling improved reaction on input during runtime, e.g. user input, input from the player (e.g. timer unit) or similar.

An apparatus that utilizes the method is disclosed in claim 7.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the structure of playback data stored on a multimedia disc, and related Java applications.

DETAILED DESCRIPTION OF THE INVENTION

Figure 1:
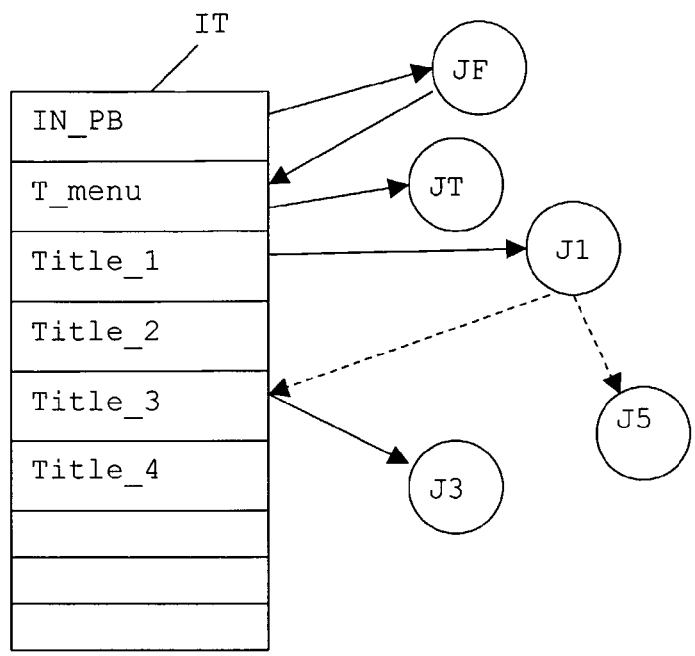

FIG. 1 depicts the structure of multimedia data and menu data stored on a pre-recorded storage medium, e.g. DVD or Blu-ray disc. When the storage medium is inserted into a player, i.e. a reproduction device, the player searches and detects the index table IT. Further, the player detects that the first entry IN_PB of the index table is a Java application JF. This can be detected e.g. when the first entry IN_PB is a file name with an extension that indicates a Java class file. The player will then set up a Java Application Manager (AM) and a Java Virtual Machine (JVM) to execute the program of the specified file. E.g. the specified application JF starts the playback of a specific audio-visual (AV) sequence or movie object, such as an intro sequence.

When the AV sequence finished, the Java application JF terminates and the player continues to step through the index table IT. The next table entry T_menu contains a link to another Java application JT, which is executed in the JVM and results in displaying the top-level menu and a background video sequence. This may be displayed until the user selects an item.

It may appear useful to measure the time during which the user gives no input, and after a certain time start an application automatically, e.g. one of the index table entries or an additional animation with following return to the top-level menu.

When an item is selected, the running application JT is automatically terminated and returns an exit value. The player may use this exit value to identify the next application to start, e.g. a particular title Title_1. According to the invention, a mapping table is used for this identifying of the next application to start. The mapping table provides a link between a return value of an application and an identifier for the next application to start.

An advantage of using such mapping table is that, for each application, one or more individual successor applications can be provided. Thus, it is possible for a content author to define a flexible sequence of titles on a disc holding several titles, instead of either defining a fixed sequence or returning to the main menu after termination of an application. E.g. when an application J1 playing back a particular selected title Title_1 is terminated, it returns an exit value that either can be mapped to a further title Title_3, which starts another Java application J3, or to a third Java application J5, which may be not selectable from the top-level menu. In this case the previously activated title remains active, since no new title is selected from the index table IT. The previously selected title, i.e. index table entry, is active. Such index table entry may be a link to a Java application, but also another program.

The mapping table according to the invention is context and application specific, i.e. each application may have its own mapping table for the current context, e.g. edition. In many cases however different applications may share the same mapping table. The identifier provided by the table may be a numeric or alphanumeric value, e.g. a title or application identifier (APPL_ID) that is associated with an application, and through which the application can be called. It may also be a parameter of a specified type or class, e.g. a file name. One or more Java applications can be assigned to a title by using the application identifiers (APPL_ID) that are associated with each Java application.

Figure 2:
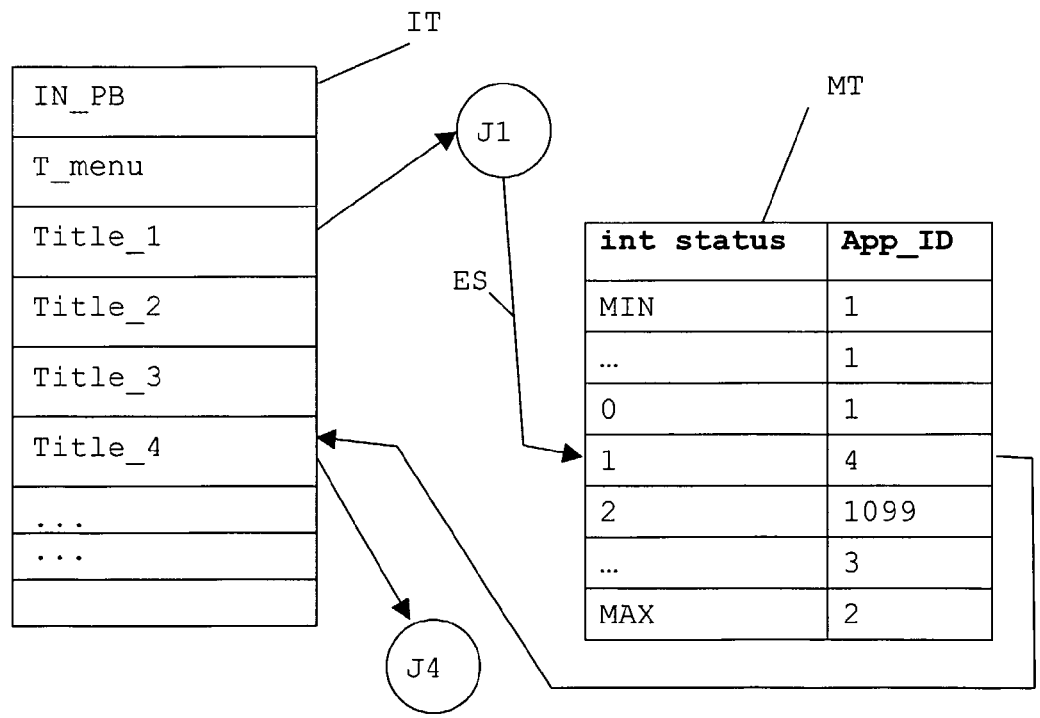
FIG. 2 usage of mapping table for mapping exit status code to next title identifier.

In FIG. 2, the application manager using a mapping table MT determines from the exit status code ES of a terminating Java application J1 an identifier that points to an entry Title_4 of the index table IT, which in turn specifies another Java application J4 to be executed on the JVM. The mapping table MT provides for each possible exit status code ES of the application J1 for which it is valid a valid identifier App_ID of the next application to execute. This is possible because the data type, and thus the bit width of a return value of applications are known. The mapping table MT of FIG. 2 comprises an entry for the minimum value MIN, one entry for the values between the minimum value and zero, one entry each for exit status codes zero, one and two, an entry for exit status codes above two but below the maximum value, and finally an entry for the maximum value. The exit code values may be e.g. four bit wide, and thus can be interpreted as signed integer values −8, . . . , 7, as in the described example. The return values may as well be of the unsigned integer type, or any other type.

In general, there are two ways of how to terminate Java applications: either the termination is initiated by the application manager, or by the application itself. For applications retrieved from a storage medium, this means in the earlier case that the user defines how to proceed, e.g. title search, while in the latter case the author of the medium defines what should happen next. Therefore, the invention enables a flexible means for content authors to provide information where to proceed when an application terminates.

The mapping table is generally a data structure for associating an input value with an output value, i.e. a return value of one application on the disc with an identifier of another application on the disc. It serves the purpose of specifying the system behavior in the case when the Java application ends, and is processed by the Application Manager (AM). An example of a conceptual mapping table is illustrated in Tab.1.

TABLE 1

Exemplary conceptual mapping table

| Exit Status | Identifier | request_resume_flag |
|---|---|---|
| Integer.MIN_VALUE | Title 1 | 0 |
| . . . | . . . | . . . |
| 0 | Title 1 | 1 |
| 1 | Application 98765 | 0 |
| . . . | . . . | . . . |
| Integer.MAX_VALUE | Title 2 | 0 |

The first column in the table defines exit status values that may be passed from the application. In a preferred embodiment of the invention, this is an integer number. The table covers all values that the application may return, from a minimum value to a maximum value. In another embodiment, a default value is given instead of minimum and maximum values. This default value may also be used if e.g. a terminating application returns no value or the returned value matches no other table entry.

The second column specifies identifiers representing titles or Java applications. State-of-the-art prerecorded optical discs are logically divided into so-called titles, where each title has an associated title number. The inventive mapping table allows specifying title numbers in the "identifier" column. This allows pre-defining or authoring a transition to another title. The transition may encompass a "Mode Change" of the player, in case that title is authored by known means other than Java, e.g. a script that defines pre-commands, AV playback commands and post-commands. The table also allows specifying in the identifier column a Java application instead of a title. In this case, the player may start the specified application within the current title, without title or mode transition.

Further, in case of a transition to another title, the player may hold resume information at runtime for that title. In case an author wishes to resume to that title, thus requesting the player to evaluate the stored resume information, this can be expressed by setting the "request_resume_flag" in the associated field in the table. This can be used e.g. to control different behavior or different return values for an application that is called multiple times.

Figure 3:
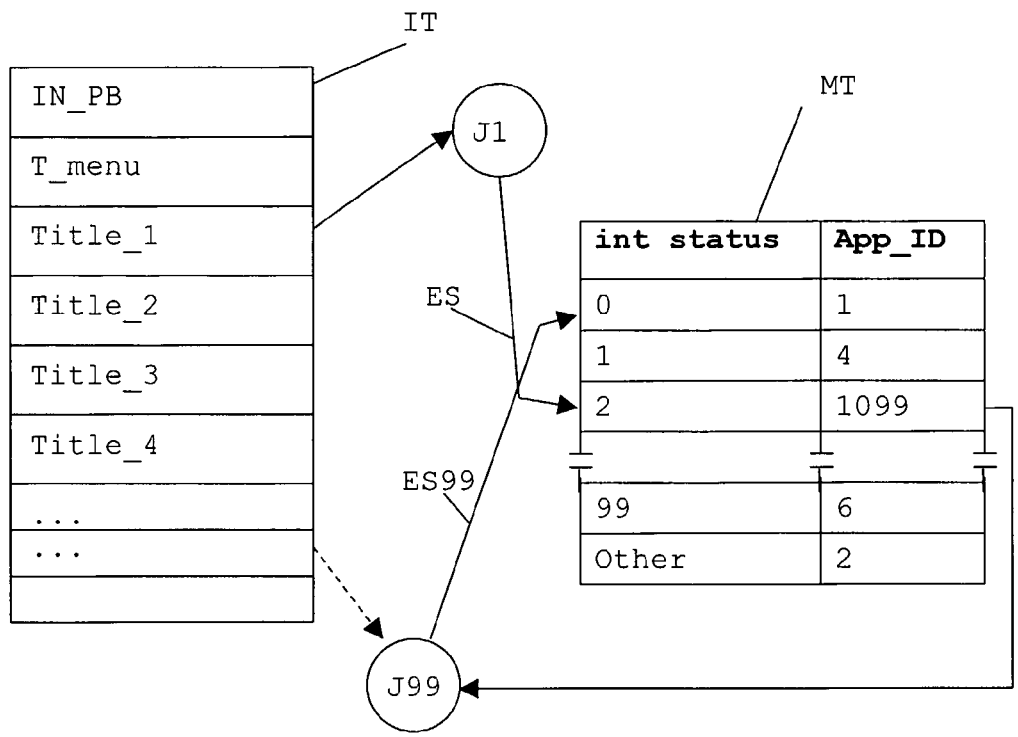
FIG. 3 usage of mapping table for mapping exit status code to next application identifier.

FIG. 3 shows an application J1 terminating with an exit status code ES being "2". The AM looks this value up in the mapping table and finds in the related entry the associated application identifier App_ID "99", which it recognizes as an identifier for a Java application J99. It loads the specified Java application J99 to a JVM, which executes it. The specified Java application J99 could in this case also be started directly from the index table IT. When the application J99 terminates, the AM receives a return value ES99 which it looks up in the mapping table MT, in order to determine the next application to execute.

Figure 4:
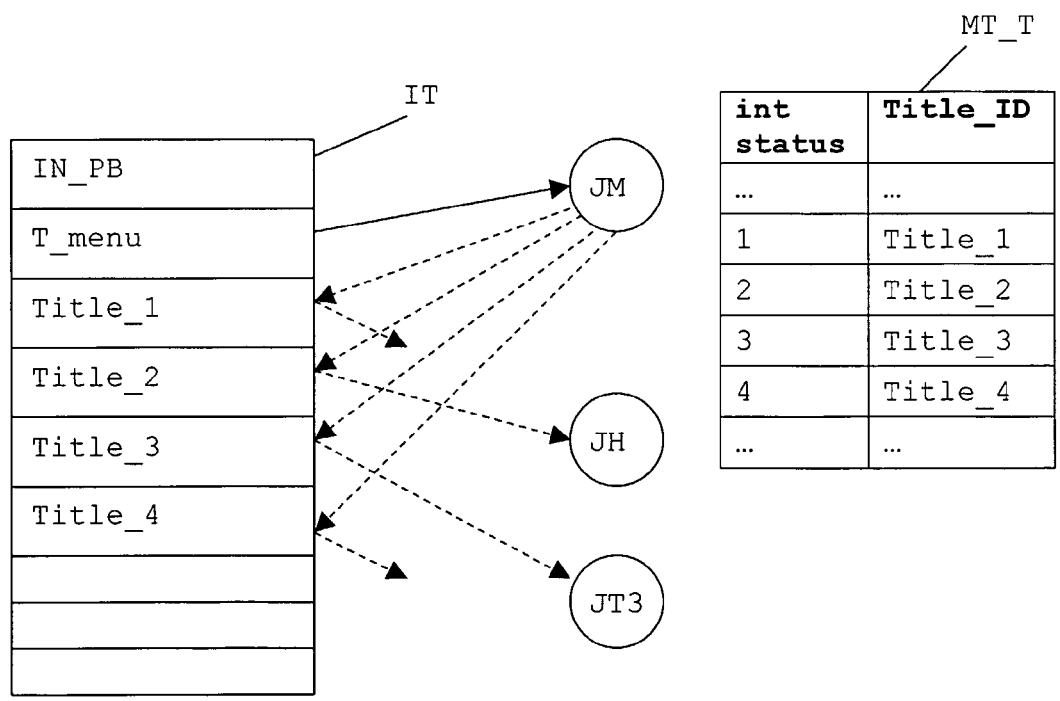
FIG. 4 structure of a Java title menu.

FIG. 4 shows how user input can be handled. A Java application JM executing a top-level menu returns an exit status value when a user has selected a menu item. The application JM has different exit status values, depending on which menu item the user has selected via an input device, e.g. remote control. The exit status value is mapped to one of the other entries of the index table IT using the above-described inventive mapping table. One of the selected index table entries Title_2 may start e.g. playback of a movie, controlled by the AM but not using a JVM, while another index table entry Title_3 starts another Java application JT on a JVM, which then plays back another video title.

The exit status value that an application returns may also be influenced by the player or other factors beyond user input, e.g. a timer unit, a pseudo-random generator or another connected device like a personal computer.

Figure 5:
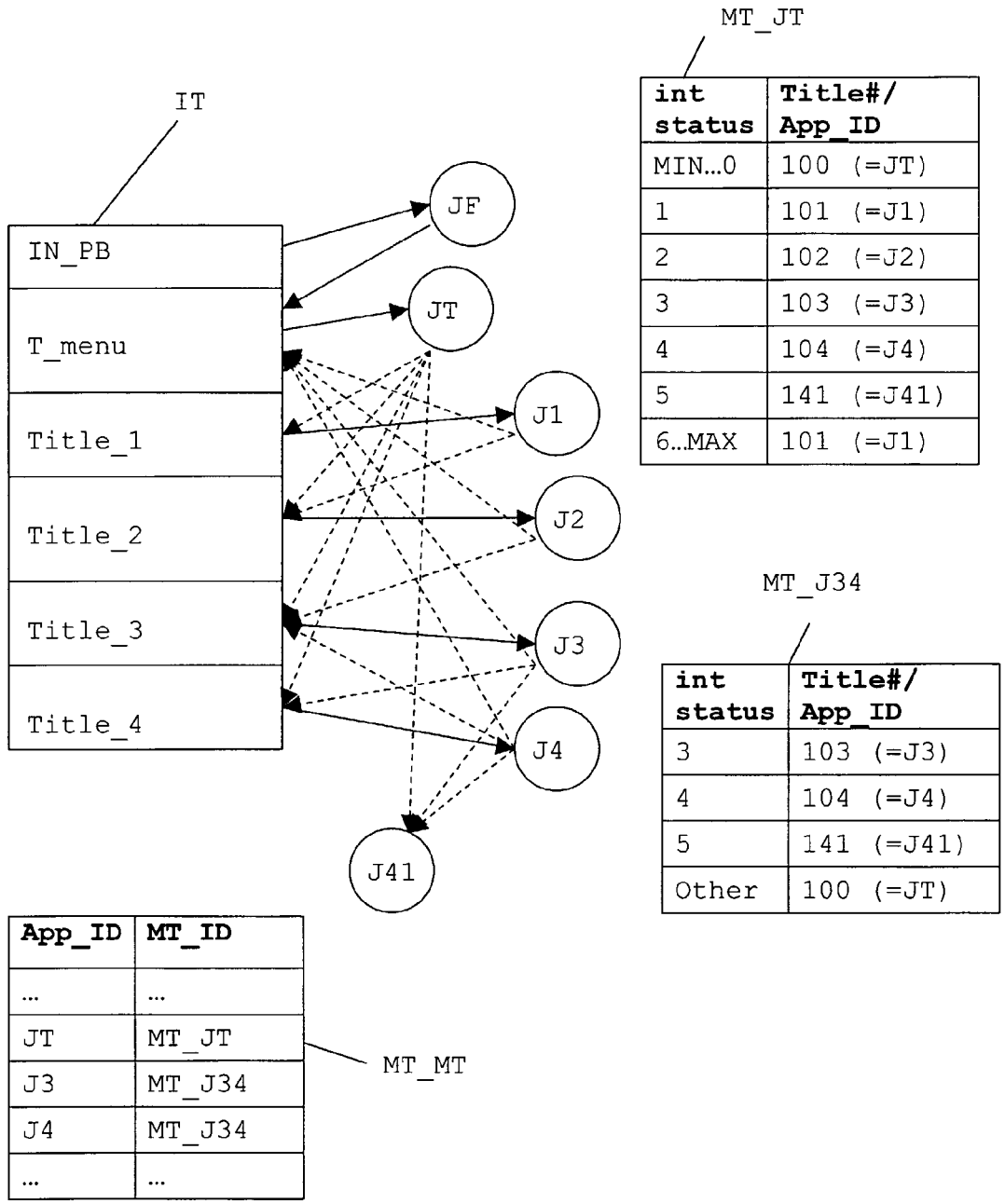
FIG. 5 exemplary mapping tables, with different applications sharing a mapping table.

FIG. 5 depicts exemplarily a short menu for a storage medium with four titles Title_1, ..., Title_4. When a player reads the storage medium, it evaluates the index table IT, and an AM steps through the entries. The first entry FirstPlayback contains an identifier for a Java application JF, which is loaded into a JVM and executed. Upon its termination, the application returns no exit code value, and no mapping table is associated with it. Therefore the AM will continue to step through the index table IT, and for the next entry find an identifier T_menu of another Java application JT. This application is also loaded into a JVM and executed, which results in displaying a menu for the user. But this application JT terminates only upon user input, or automatically after a predefined time if the user provides no input. A timer unit may control this. When the user e.g. selects Title_3 from the menu, the running application JT returns an exit code value of "3" to the AM. The AM will use a mapping table MT_JT that is associated with the terminating application to map the exit code value "3" to an application or title identifier "103", which points e.g. to the respective index table entry Title_3. If the user selects another menu item, the return value of the menu application JT may point to another index table entry, or directly to an application J41. The selected index table entry Title_3 represents another Java application J3, which is then loaded into the JVM and executed, e.g. a movie or game is played.

Upon termination of this application, it returns an exit status value to the AM, which uses a mapping table MT_J4 that is valid e.g. for two different applications J3 and J4. The Java application J3 may have been programmed actually for another storage medium, another version of the medium or the like, and may return exit code values between two and seven. The author may however have decided that exit code values of two, six and seven from the application J3 should be ignored for this edition of the medium, while in another edition these codes may have another function. Therefore, the same mapping table MT_J4 than for another application J4 can be used.

Generally, two or more applications may share a mapping table if they have the same relevant return values. Thus, mapping tables are medium-specific, while the return values of an application are application specific.

There are manifold ways of associating an application with a mapping table according to the invention. Determination of the valid exit-code mapping table can be done at any time, but preferably while an application is running. The application can be any piece of executable program, and the mapping table any data structure that links an input value and an output value. Examples for the association between application and mapping table are via file name, via directory structure or via a separate mapping table.

In the first case, the application program and the file that holds the mapping table have e.g. the same file name, with different file name extensions.

In the second case, the application program and the file that holds the mapping table may be stored in the same directory, or folder, on the medium.

In the third case, a separate mapping table for mapping the application identifier of a running application to an identifier for the respective exit-code mapping table may be stored on the medium.

According to the present invention the following steps are performed when an application initiates its lifecycle end: First, an exit status value is provided. Second, the exit status value is translated to an identifier using a mapping table, and third the player continues with the entity that is represented by the identifier. These steps are explained in more detail in the following.

For the "classical" application model, the exit status value is provided through the System.exit(int status) method, i.e. a terminating application returns an integer value representing its status to the next control layer, i.e. the AM. In case of the Xlet application model, the application signals only the end of its lifecycle to the AM through the AMI. In addition, according to the present invention, the terminating application provides an exit status to the AM. There are various methods how this can be achieved. In a preferred embodiment, the AMI is extended so that an application can directly pass the exit status value to the AM. In another embodiment of the invention, the exit status value is stored at a specified location that is known and available to both the application and the AM, before signaling the end of the lifecycle. For this purpose, any kind of volatile or non-volatile memory can be used.

In case the application delivers no exit status information to the AM, e.g. when the state-of-the-art AMI is used, the table may provide a special entry to handle that case or a default value to be used.

In the second step, the AM uses the information in the mapping table to translate the actual exit status into an identifier, i.e. table look-up.

In the third step, the player continues with the entity that is represented by the identifier. As described above, this can be a transition to another title if a title number is specified, which may encompass a "Mode Change". If the identifier represents a Java application, the player starts the specified application within the current title, i.e. no title or mode transition is necessary.

The above-described Tab.1 is a conceptual table. The table can be stored more efficiently than illustrated above, e.g. by using default values, as shown in the following Tab.2.

TABLE 2

More efficiently coded mapping table

| int status | Title#/App_ID |
|---|---|
| 0 | 3781 |
| 1 | 8273 |
| 2 | 3922 |
| default | 1 |

In the preferred embodiment, the table covers the complete range of possible exit status values of the corresponding application. In another embodiment, the table needs not cover the complete range or leave some identifier fields empty. In this case, no transition is performed at all if a return value cannot be mapped to an application or title.

For the values in the right-hand column of Tab.2 that identify applications or titles there can be value ranges reserved, e.g. a first range for title identifiers and a second range for application identifiers.

Advantageously, the current invention provides very robust means to specify the system behavior at the end of a Java application lifecycle. In particular, the mapping table can easily be verified for consistency before public release of the disc, and thus ensures that at application runtime a valid title or application is launched for any exit status value.

Another advantage of the invention is the easy reuse of Java applications. This comprises reusing an application in different configurations with the same disc, as described above, as well as using a particular application to author different discs. Since the system transition behavior is defined by the mapping table, and thus separately from the application itself, the same application can easily be reused in different contexts. For example, the same application can easily be integrated into different discs. Only the mapping table needs adaptation, but no programming is needed to change application code.

Another advantage of the invention is the possibility to launch another Java application upon an application terminating, i.e. at the end of an application lifecycle. This provides a simple means to integrate a number of applications into one title. State-of-the-art solutions would require programming work to integrate the different applications into one single application. Therefore, the invention supports flexible and fine-grained structuring of titles. This improved modularity provides additional flexibility to content authors.

Moreover, the invention can serve as a building block to integrate Java applications into state-of-the-art systems.

In one embodiment of the invention, program data of the terminating software application and the next software application to be executed are retrieved from a read-only storage medium, and the data representing the mapping table are retrieved from a rewritable storage medium, e.g. hard-disk drive (HDD). This has the advantage that the mapping table can later be modified. Rules may be provided for the case that two mapping tables are available, one on the medium where the terminating application is stored and one on a local storage medium such as HDD, e.g. "mapping tables from HDD are higher prioritized" or similar.

The general idea of the invention is a conceptual mapping table that is used to translate application exit status information (Application specific) into identifiers representing titles or Java applications (disc specific). When a Java application finishes, the player evaluates the mapping table and continues with the specified entity derived from the table.

Main advantages of the invention are that it allows flexible transitions to other titles or Java applications, easier verification due to improved robustness, easy reuse of applications, and higher flexibility. Particularly, verification of the medium after authoring is easier because it can be performed modularly in steps, instead of having to verify the whole medium at once in different contexts.

The invention can be used for data structures, particularly data structures stored on storage media, which contain data for applications to be executed on a virtual machine, such as Java applications to be executed on a JVM. The invention may be used with application programs written in the Java programming language, or with programs written in other languages that execute on a JVM, or a Virtual Machine in general.

The invention claimed is:

1. A method for automatically selecting a title stored on a read-only storage medium that comprises one or more titles and an index table listing said titles and being usable for title selection, and that comprise one or more further titles not listed in said index table, wherein titles may be software applications including reproducible audiovisual (AV) data or programs for execution on a virtual machine, and wherein all titles have associated title identifiers, including the steps of:

executing or reproducing a first title, wherein the first title provides an exit status value upon termination;

translating the exit status value to an identifier representing an entry in said index table or representing a title identifier of a title being stored on the storage medium, wherein for the translating a mapping table is used, and wherein said storage medium comprises at least one title having a first exit status value that represents an entry in said index table, and at least one further title having a different second exit status value that represents a title identifier;

determining whether the identifier represents an index table entry or a title identifier;

if the identifier represents an index table entry, translating it to a title identifier using the index table; and executing or reproducing the title that is represented by the identifier or by the title identifier corresponding to the index table entry wherein a first range of values of said identifier represents an entry in the index table, and a second range of values different from said first range of values of said identifier represents a title identifier of one of the titles stored on said storage medium.

2. Method according to claim 1, wherein the data representing the first title and the next title to be executed are retrieved from an optical disc, and the data representing said mapping table are retrieved from a rewritable storage medium not being said optical disc.

3. Method according to claim 1, wherein the titles are programs for execution on a virtual machine and include commands for reproduction of AV data stored on the storage medium.

4. Method according to claim 1, wherein the mapping table comprises for each possible exit status value of said first title a valid identifier for the next title to be executed or reproduced.

5. Method according to claim 4, wherein said read-only storage medium contains a plurality of mapping tables being associated to different titles.

6. Method according to claim 1, wherein, if the next title has no corresponding entry in the index table, the entry corresponding to the first title remains selected in said index table upon execution or reproduction of the next title.

7. Method according to claim 1, wherein one title stored on said storage medium and listed in said index table as first title has no exit status value, and all other titles stored on said storage medium and listed in said index table have an exit status value that represents either an entry in said index table or a title identifier.

8. Method according to claim 1, wherein at least one entry in said index table covers a range of exit status values.

9. Apparatus for automatically selecting a title stored on a read-only storage medium that comprises one or more titles and an index table listing said titles and being usable for title selection, and that comprise one or more further titles not listed in said index table, wherein titles may be software applications including reproducible audiovisual (AV) data or programs for execution on a virtual machine, and wherein all titles have associated title identifiers, the apparatus including: a central processing unit having means for receiving an exit status value from a terminating software application;

means for translating the exit status value to an identifier representing an entry in said index table or representing a title identifier of a title being stored on the storage medium, wherein a mapping table is used, and wherein said storage medium comprises at least one title having a first exit status value that represents an entry in said index table, and at least one further title having a different second exit status value that represents a title identifier; and means for determining whether the identifier represents an index table entry or a title identifier;

means for translating the identifier to a title identifier using the index table; and means for executing or reproducing the title that is represented by the identifier or by the title identifier corresponding to the index table entry;

wherein a first range of values of said identifier represents an entry in the index table, and a second range of values different from said first range of values of said identifier represents a title identifier of one of the titles stored on said storage medium.

10. Apparatus according to claim 9, wherein the data representing the software application and the next title to be executed are retrieved from an optical disc, and the data representing said mapping table are retrieved from a rewritable storage medium not being said optical disc.

11. Apparatus according to claim 9, wherein one title stored on said storage medium and listed in said index table as first title has no exit status value, and all other titles stored on said storage medium and listed in said index table have an exit status value that represents either an entry in said index table or a title identifier.

12. Apparatus according to claim 9, wherein at least one entry in said index table covers a range of exit status values.

* * * * *